US006685053B2

(12) United States Patent
Hawkes et al.

(10) Patent No.: US 6,685,053 B2
(45) Date of Patent: Feb. 3, 2004

(54) APPARATUS FOR REMOVAL OF ICE FROM A STORAGE BIN

(75) Inventors: Richard Blair Hawkes, Bethlehem, PA (US); Brian Wayne Haupt, Windgap, PA (US)

(73) Assignee: Follett Corporation, Easton, PA (US)

( * ) Notice: Subject to any disclaimer, the term of this patent is extended or adjusted under 35 U.S.C. 154(b) by 23 days.

(21) Appl. No.: 09/948,290

(22) Filed: Sep. 6, 2001

(65) Prior Publication Data

US 2003/0042267 A1 Mar. 6, 2003

(51) Int. Cl.[7] .......................... B65H 3/60; G07F 11/00; B65G 33/00; G01F 11/00; G01F 13/00

(52) U.S. Cl. ....................... 221/200; 221/204; 198/657; 198/670; 222/235

(58) Field of Search ................................. 222/450, 504, 222/639, 643, 235; 62/137, 76, 330, 354; 221/200, 202, 204; 198/657, 661, 670

(56) References Cited

U.S. PATENT DOCUMENTS 3,610,482 A * 10/1971 Van Steenburgh, Jr. ..... 222/403
3,696,762 A * 10/1972 Holdham .................... 108/134
3,937,365 A 2/1976 Shelley et al.
4,104,889 A * 8/1978 Hoenisch ..................... 62/137
4,168,805 A 9/1979 Taylor
4,512,502 A 4/1985 Landers
4,694,661 A 9/1987 Landers
4,732,301 A * 3/1988 Tobias et al. ............... 222/203
4,771,609 A * 9/1988 Funabashi .................... 62/137
4,921,149 A * 5/1990 Miller et al. ................ 222/639
4,969,583 A 11/1990 Torimitsu et al.
5,005,364 A * 4/1991 Nelson .......................... 62/76
5,029,737 A 7/1991 Yamamoto
5,088,300 A 2/1992 Wessa
5,277,016 A 1/1994 Williams et al.
5,299,427 A * 4/1994 Miller et al. ............. 222/146.6
5,910,164 A 6/1999 Snelling et al.
6,039,220 A * 3/2000 Jablonski et al. ........... 222/236
6,224,297 B1 * 5/2001 McCann et al. .............. 406/50
6,540,067 B1 * 4/2003 Sellers et al. ............... 198/657

OTHER PUBLICATIONS

Prior Art document 1 found Sep. 9, 2000 —(Kloppenberg).
Prior Art document 2 found Sep. 5, 2000 —(Mannhardt, Inc.).
Prior Art document 3 found Sep. 5, 2000 —(MGR Equipment Corp.).

* cited by examiner

*Primary Examiner*—Gene O Crawford
(74) *Attorney, Agent, or Firm*—Paul & Paul

(57) ABSTRACT

An apparatus for storing ice in a container and dispensing ice from the container is provided in the form of a storage bin, having ice agitating apparatus for engaging ice to loosen the same and to keep ice particles from adhering together in a common mass. An ice dispenser is provided for delivering ice from a lower to an upper end. The ice dispenser and the ice agitator are provided with separate drives.

17 Claims, 8 Drawing Sheets

APPARATUS FOR REMOVAL OF ICE FROM A STORAGE BIN

BACKGROUND OF THE INVENTION

Ice dispenser bins are used in many situations, wherein ice is periodically made or generated and delivered or dropped into a storage bin, where it resides until the need arises to use the ice. In order to keep the ice pieces or particles from all adhering together into one large structure, it is known to agitate the ice. Generally, the ice pieces are dispensed from a lower location in the bin, to an upper location, to be discharged to bags, a cart, or other suitable container.

Because ice is delivered from an upper location to a lower location, to be later moved from a lower location to an upper location, it is known that there sometimes forms a bridge of ice pieces, inhibiting the delivery of ice from the upper location to the lower location.

It has become commonplace to periodically break up the bridge by reaching into the bin, manually, with a paddle, to strike the ice bridge and release the pieces or articles, to fall to the bottom of the bin.

In some cases, there is provided a drive for lifting ice from the bottom of the bin to the discharge, and when ice is thus being discharged, ice in the bin is simultaneously agitated to break up any bridge then forming, and to loosen ice particles so that they can fall to the bottom of the bin.

One disadvantage of such prior art type of devices is that they lack durability and require manual bridge-breaking intervention in order to keep the ice loose so the ice will properly dispense. Such manual agitation can create adverse sanitation problems.

Additionally, prior art ice dispensing equipment is often lacking in versatility.

Some users of ice dispensing equipment, such as supermarkets, purveyors of meat and fish and vegetables, desire the ability to fill large containers, rather than simply to fill bags of ice. For example, the ability to optionally fill carts as well as bags is a feature that has been missing from the art.

SUMMARY OF INVENTION

The present invention is directed to providing an ice storage bin having a dispenser for dispensing ice therefrom and an agitator for engaging ice pieces and agitating them, wherein there are provided driving means for driving the ice dispenser and for driving the ice agitator, such that they can be driven separately from each other.

Additionally, there is an upper bin section that has tapered walls to prevent bridging of ice therein, which facilitates the gravity dropping of ice from the upper bin to the lower bin. The lower bin section is separate from its structural support or frame, the latter carrying the drive loads, which frees the lower bin from carrying the drive loads.

Accordingly, it is an object of this invention to separately drive an ice dispenser and an agitator for ice in a storage bin.

It is a further object of this invention to accomplish the above object, wherein ice is delivered from a lower location within the bin to an upper location for discharge of ice.

It is yet another object of this invention to accomplish the object immediately above, wherein different types of containers, such as bags, carts, etc. can be used to receive ice discharged from an upper end of the bin.

It is a further object of this invention to accomplish the above objects, wherein the agitator comprises right and left, preferably somewhat helically configured and oppositely directed agitators carried on the same rotating agitator bar, whereby thrust loads in each direction from the right and left agitators tend to offset each other.

It is another object of this invention to provide an upper bin section that has tapered walls, to prevent bridging of ice therein.

It is yet another object of this invention to have a lower bin section that is separate from the lower structural frame, such that the structural frame carries the drive loads; not the lower bin section.

Other objects and advantages of the present invention will be readily understood upon reading the following brief descriptions of the drawing figures, detailed descriptions of the preferred embodiments, and the appended claims.

BRIEF DESCRIPTIONS OF THE DRAWING FIGURES

DETAILED DESCRIPTIONS OF THE PREFERRED EMBODIMENTS

Figure 1:
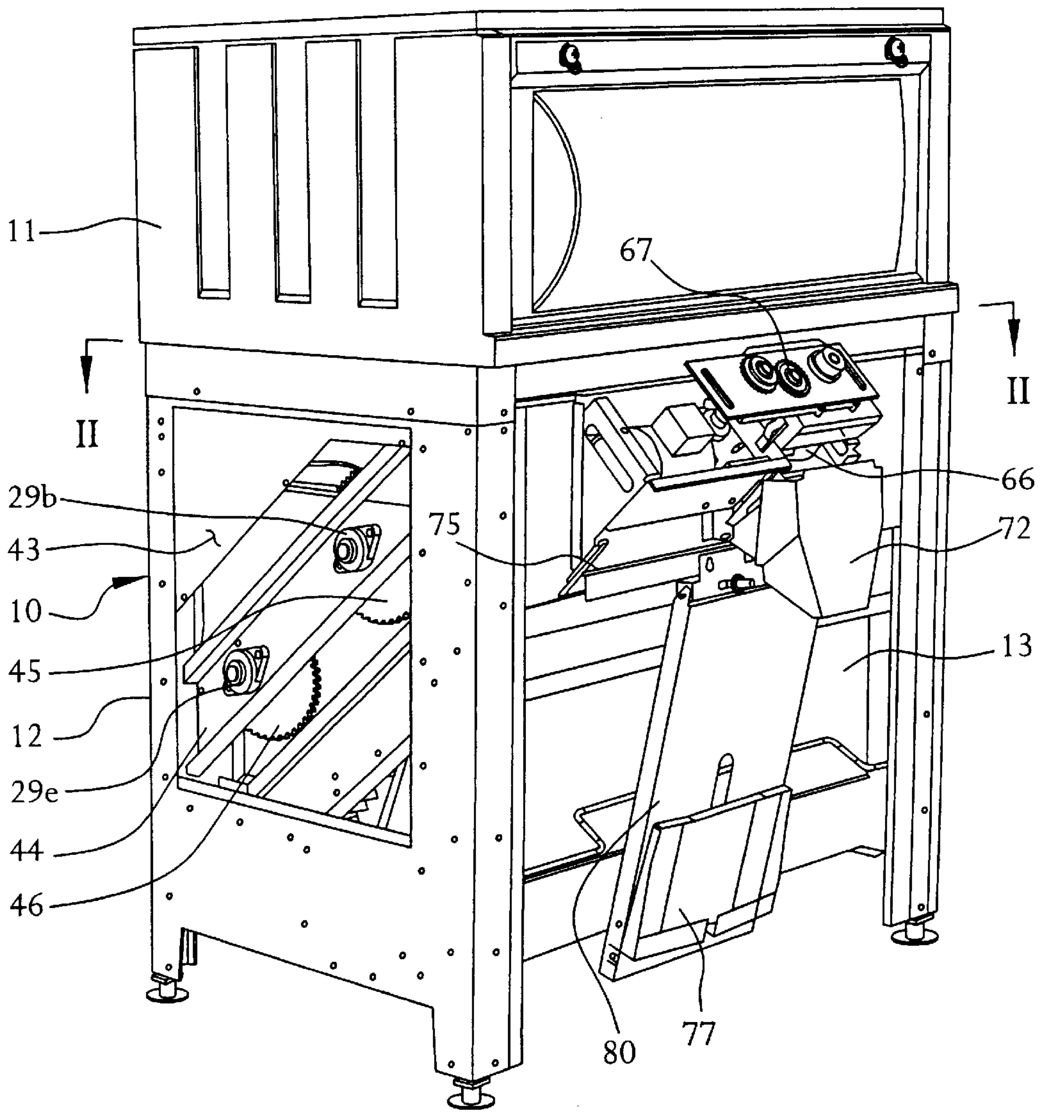
FIG. 1 is a front perspective view of the apparatus of this invention.

Referring now to the drawings in detail, reference is first made to FIG. 1, wherein there is shown the apparatus 10 of this invention, including an upper ice bin 11 and a lower ice bin apparatus 12.

The ice making apparatus (not shown) may be of any conventional type, in that the particular ice making apparatus does not form an essential part of the present invention. Generally, the ice making apparatus will, however, be a suitable type of apparatus for making ice in the form of ice cubes, pieces, particles, shavings, or nuggets, and will generally be disposed above the upper bin 11, although, in the alternative, the same could be disposed at a location remote from the ice bin 11, with a suitable delivery system for delivering ice into the ice storage area provided by the bin 11. However, preferably, the ice making apparatus will be disposed generally above the bin 11, such that ice may pass to the ice bin 11, via gravity, and then enter the bin 12, via gravity.

Figure 2:
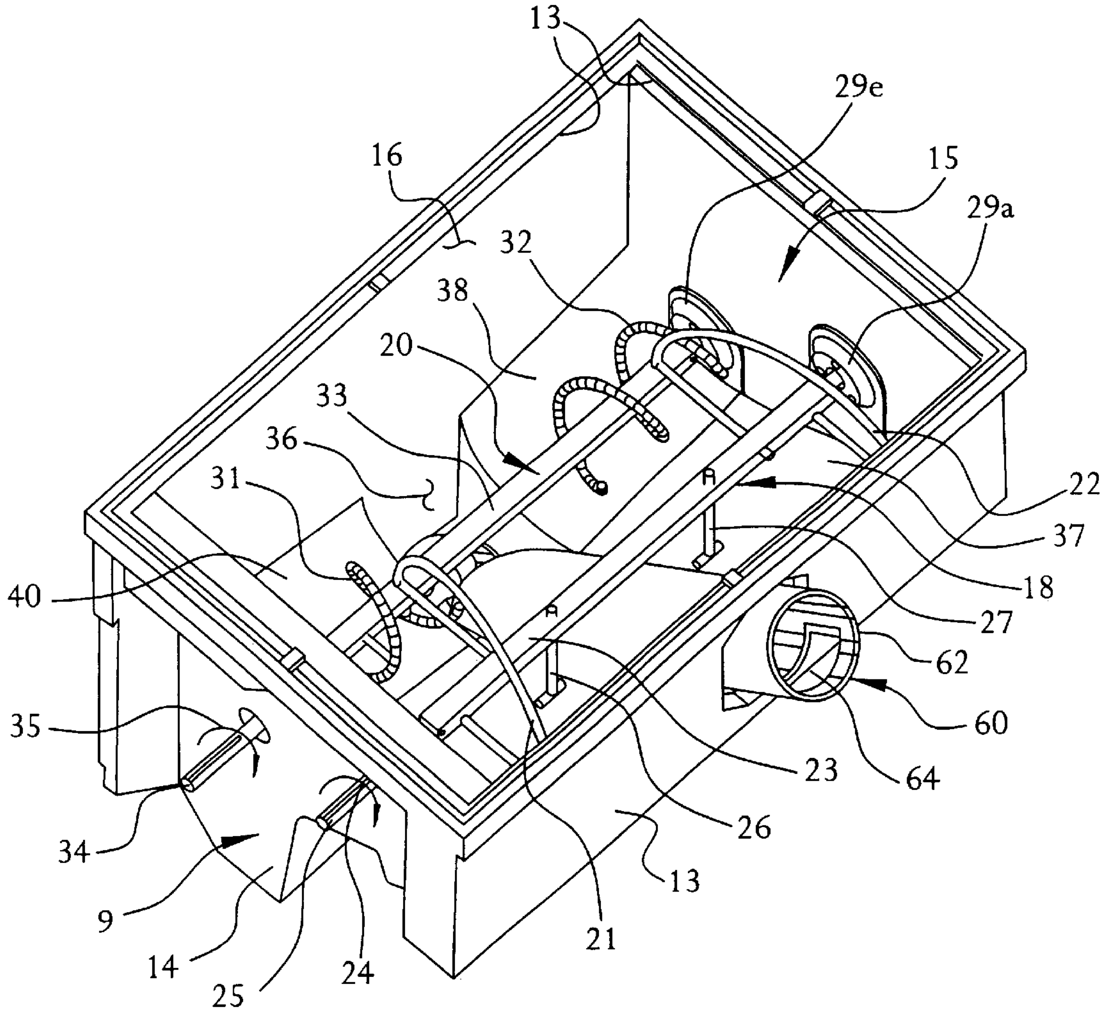
FIG. 2 is a fragmentary top perspective view of the upper end of the ice bin apparatus of the invention, as viewed generally along the plane II—II of FIG. 1.

With reference to FIG. 2, it will be seen that the bin 9 has front, left and right side and back walls 13–16, as shown, and an open upper end 17, for receipt of ice therein.

Ice agitators 18 and 20 are provided in the bin 9.

Agitator 18 comprises a pair of left and right wire augers 21 and 22, preferably generally helically constructed, as shown, each carried by the same agitator bar 23, such that, when the shaft 25 is rotated in the clockwise direction shown at 24, the bar 23 which is connected to the shaft 25 will likewise rotate in the clockwise direction, such that the augers 21, 22 will tend to drive ice toward the opposite auger, such that ice pieces or particles will tend to move toward the center of the bin 9, between the walls, 14, 15.

The bar 23 may likewise carry radial rods 26, 27, generally configured as shown, to also facilitate ice breakup.

The agitator 20 likewise comprises a pair of oppositely arranged, preferably helically configured wire augers 31, 32, carried by the bar 33, that is likewise driven by shaft 34, for rotation in a clockwise direction 35, for conveying ice toward a central zone 36 generally near the back wall 16, at the lower end of the bin 9. The augers, 31, 32, like the augers, 21,22, being arranged in pairs carried by their respective bars 33, 23, are disposed such that the thrust loads resulting from conveying ice are caused to oppose each other.

It will also be noted that the sloped bottom wall 37 near the front wall 13 and the curved bottom wall portions 38, 40 near the back wall 16 are configured to cooperate with the augers of the respective agitators 18, 20, to cooperate in moving ice pieces or particles toward the central back or rear zone 36.

The agitator shafts 25, 34 are mounted in appropriate bearings 29*b*, 29*f* and 29*e*, 29*g* carried on opposite frame members 44, 39, on each side of the frame, outside respective side walls 15, 14 of bin 9. In this regard, it will be noted that in FIG. 1 a sheet metal cover 43 is shown as being open, for the sake of clarity.

Figure 5:
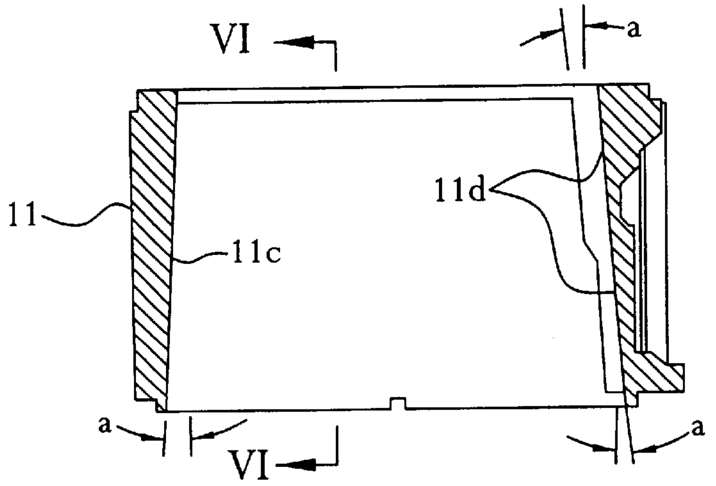
FIG. 5 is a vertical sectional view, taken through the upper bin section, generally along the lines V—V of FIG. 4, showing the tapered front and rear walls which prevent ice bridging.
Figure 6:
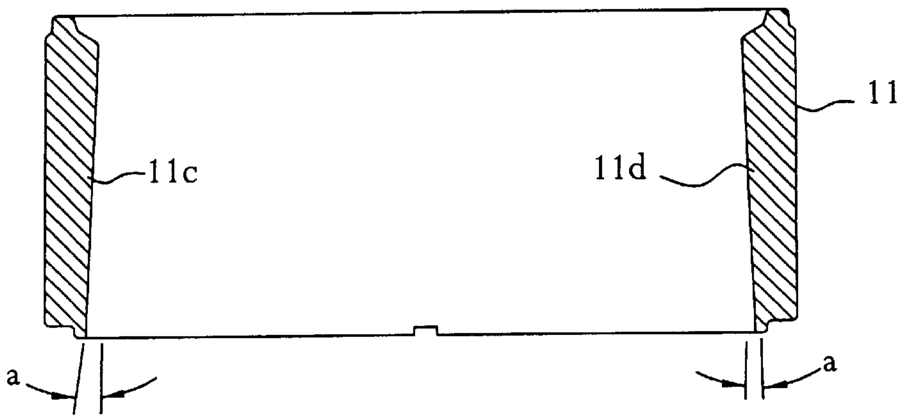
FIG. 6 is a vertical sectional view, taken generally along the line VI—VI of FIG. 5, showing the tapered side walls which prevent bridging.

With reference now to FIGS. 5 and 6, it will be seen that the upper bin 11 has internal opposite side walls 11*a* and 11*b*, and opposite rear and front walls 11*c* and 11*d*, that are at an angle "a" with the vertical, as shown. The angle or taper "a", is selected such, that ice located in the upper bin 11 will be prone to fall from the bin 11, via gravity. It has been found that an angle "a" of approximately 2° is appropriate to facilitate such discharge.

Figure 9:
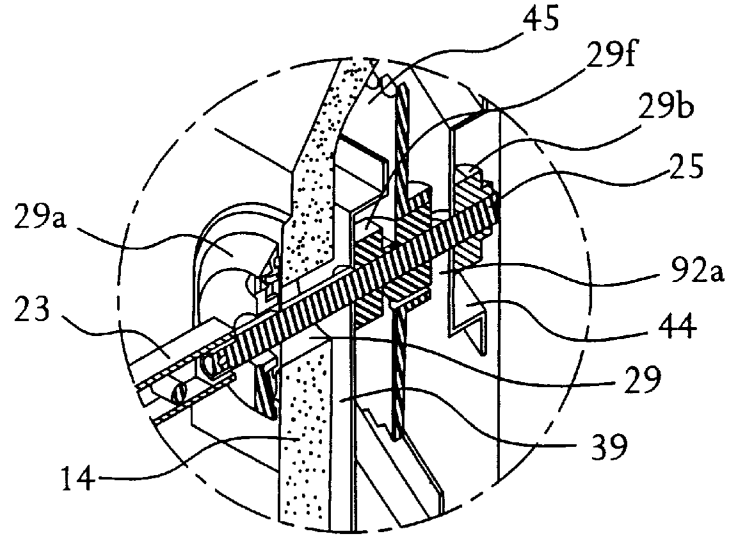
FIG. 9 is a detail view of the shaft mounting, in enlarged form, illustrated by the detail area IX shown in FIG. 8.
Figure 10:
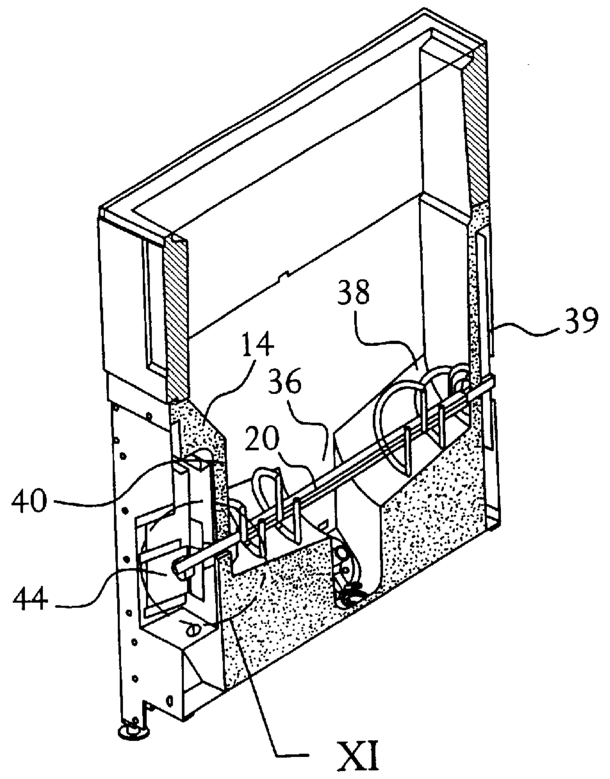
FIG. 10 is a vertical sectional view, taken generally along the line X—X of FIG. 7.

With reference now to FIGS. 7–11 it will be seen that the lower bin 9, inside the bin apparatus 12, has a sloped inner front wall 37, and rear wall portions 38, 40, that are likewise sloped, to facilitate discharge, via gravity, of ice into the center zone 36 shown in FIG. 10, for dispensing therefrom, as will be described hereinafter.

It will be seen, with reference to FIGS. 7–11, that the bin 9 is separate from the frame of the bin apparatus 12.

In this regard, reference is made to the detail view shown in FIG. 9 wherein the bar 23 will be seen to terminate in shafts 25 at opposite ends (only one end being shown), and that each shaft 25 passes through a clearance opening 29 in wall 14 of bin 9, with its bearings 29*b* and 29*f* mounting the same for rotation, and with the bearings 29*b* and 29*f* being physically mounted in and carried by the frame strut portions 44 and 39. Suitable non-supporting seals 29*a* are provided, for sealing the shaft 25 across clearance opening 29.

Thus, it will be seen that thrust loads in axial directions, and radial loads as well, are not carried by the walls 14, 15 of the bin 9, but rather, are carried by the supporting frame for the bin apparatus 12.

Figure 11:
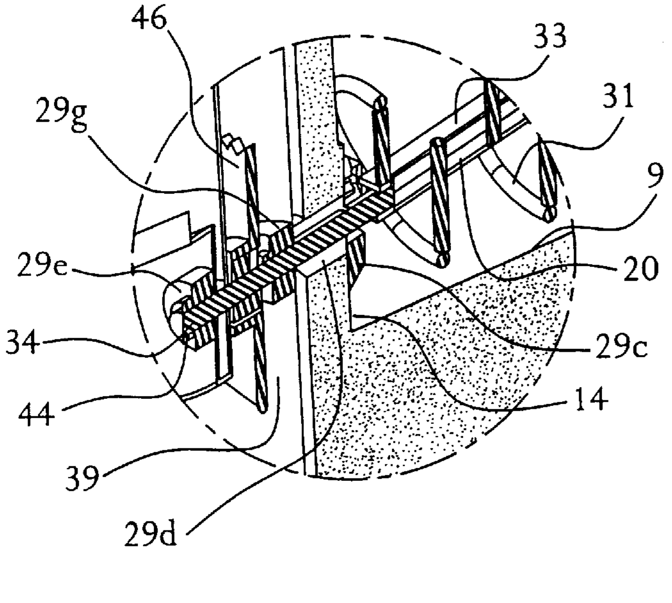
FIG. 11 is a detail view showing, in enlarged form, the detail area designated by X1 of FIG. 10

Similarly, with respect to FIG. 11, it will be seen that the bearing 42 is carried by frame member 44, not the wall 14 of bin 9 and that a suitable seal 29*c* likewise seals clearance opening 29*d* in wall 14 and that thrust loads from bar 33 are transmitted to the frame member 44 via bearing 42 and to thrust bearing 29*e* which likewise is carried by the frame, and not the bin 9.

Figure 3:
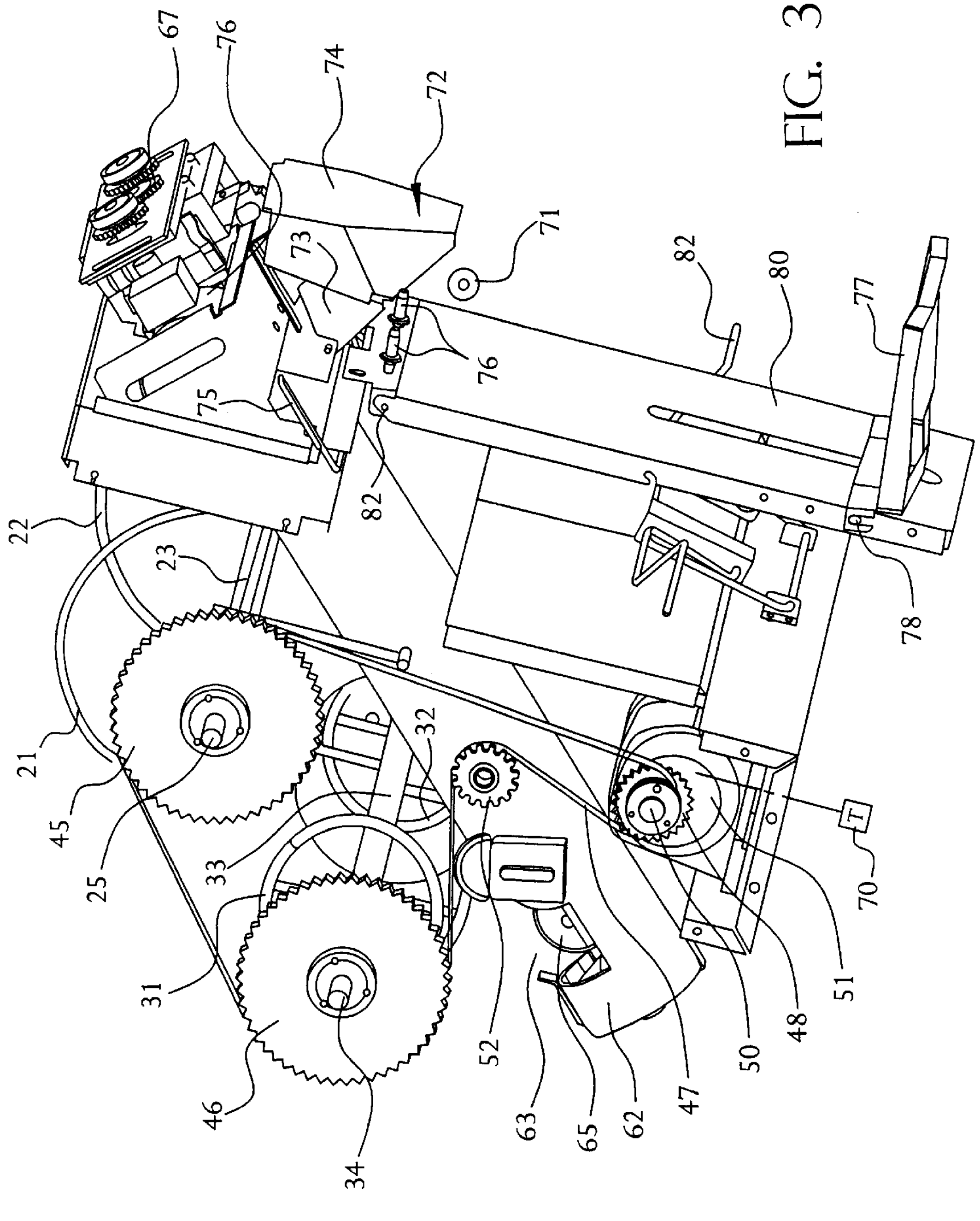
FIG. 3 is a fragmentary, perspective view of the operating components for driving the augers in accordance with the ice bin dispensing apparatus of FIG. 1.
Figure 4:
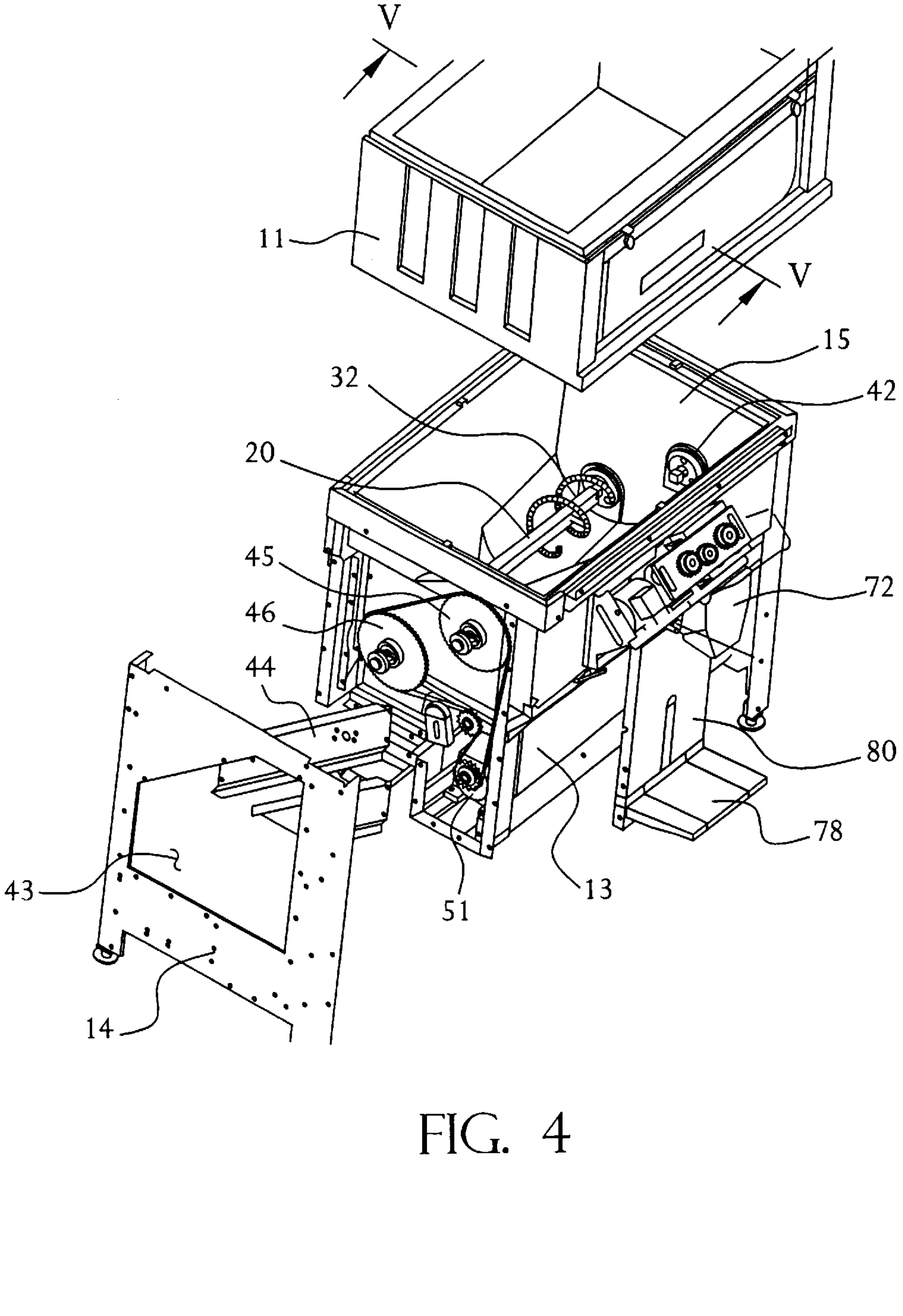
FIG. 4 is a fragmentary, perspective, exploded view of the apparatus of FIG. 1.

A pair of sprockets 45, 46 are shown, in FIGS. 1 and 3, mounted on the respective shafts 25, 34, commonly driven via a common drive chain 47 that, in turn, is driven via drive sprocket 48 carried on the shaft 50 of the agitator drive motor 51. Motor 51 may be of any suitable type, such as an alternating current A.C. electric motor, and may be provided with a take-up idler sprocket 52.

An ice dispenser, generally designated by the numeral 60 is provided, in the form of an acutely angled dispenser tube 62, generally mounted and disposed at an acute angle, preferably of 45° with the vertical, or with the front wall 13, as shown in FIGS. 1 thru 4. The dispenser 60 includes a tube 62 having an ice inlet 63 at the lower end, in the upper portion thereof, to receive ice pieces or particles from the bin zone 36 at the lower back or rear end of the bin 9, and to deliver the ice upwardly to an ice outlet 64 at the upper end. The dispenser 60 includes a dispensing auger mounted in the tube 62, and preferably in the form of a continuous helically configured, rotatably driven auger 65 disposed within the tube 62, to enable carrying ice from the dispenser inlet 63, to the outlet 64. The auger 65 is rotatably driven by a preferably electric A.C. motor 66, via suitable chain drive 67, for driving the auger 65.

The motor 66 is driven completely separately from the motor 51, such that the operation of the agitators 18 and 20 via the motor 51 is not tied to the operation of the auger 65 via its motor 66.

The motor 51 may be controlled by a suitable timer, schematically shown at 70, if desired.

The operation of the dispenser motor may be controlled by a suitable proximity detector 71 or the like, in the form of a switch, infrared beam, or any other suitable switching or detecting mechanism, for activating the motor 66 to cause the auger 65 to rotate and deliver ice pieces or particles up the tube 62, to discharge at 64, via a discharge chute 72. The chute 72 may have an inside chute component 73 and an outside chute component 74, with the inside chute component 73 being adjustable via positioning of a suitable adjusting handle 75, for delivering ice into a bag (not shown) removably carried on bag-holding pins 76 beneath the chute 73.

Additionally, the bag (not shown) for receiving ice may be carried on a suitable lower support 77, mounted at 78 on generally vertically disposed support 80, which support 80 is also pivotally mounted at 81, to be moved toward a more rearward direction from that shown in FIG. 3, upon activation of a suitable handle 82 for varying the position of the supports 77 and 80, so that carts (not shown) can be filled.

To fill carts, the support 77 is removed, and the support 80 is pivoted inward. The handle 75 is actuated to position the chutes 73 and 74 outwardly, relative to the front of the apparatus 12.

Figure 7:
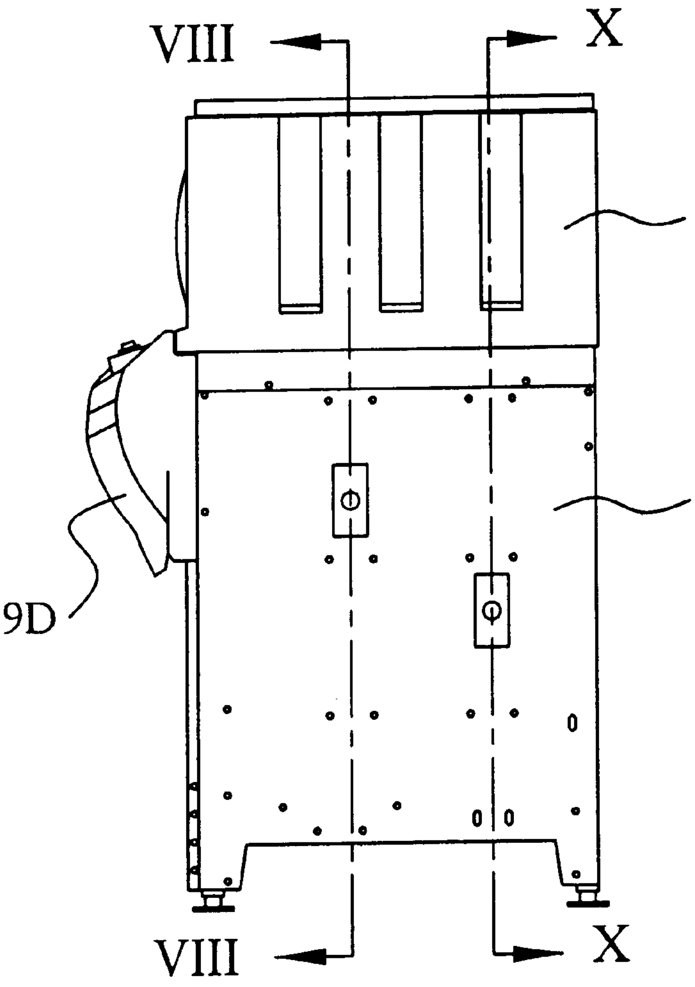
FIG. 7 is a side elevational view of the apparatus of FIG. 1, taken from the opposite side to that shown in FIG. 1.
Figure 8:
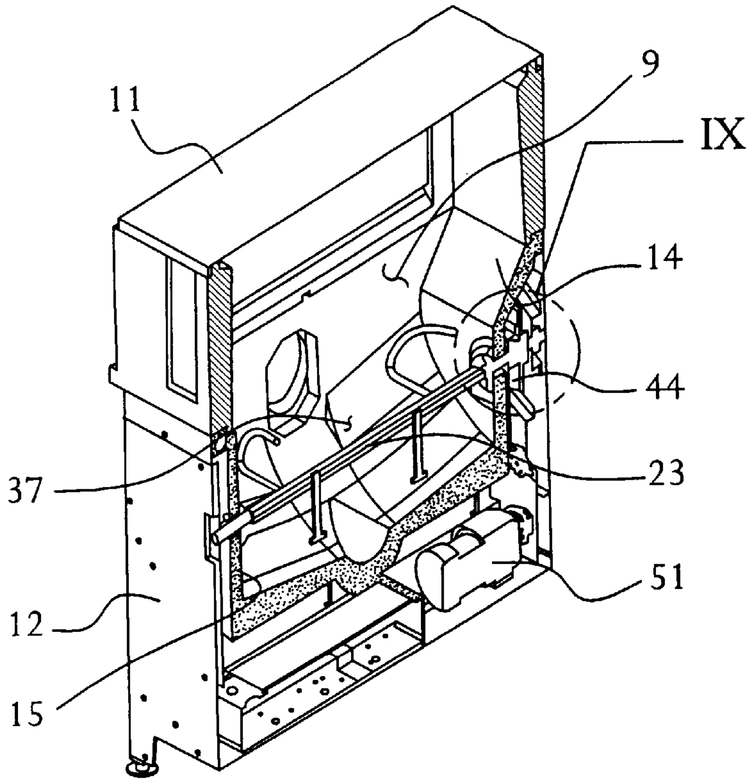
FIG. 8 is a vertical sectional view, taken through the apparatus of FIG. 7, generally along the line VIII—VIII of FIG. 7.

If desired, a blower (not shown) may be housed within the cover 90 shown in FIG. 7, to facilitate blowing open a bag, when ice is to be dispensed into a bag, as distinguished from a cart. This facilitates semi-automatic bag filling. The air is used in conjunction with the inner and outer chutes 73, 74 to open the bag and when ice is delivered the outer chute 74 traps the bag in an open position.

It would thus be seen that the goals of the present invention as set forth in the objects and summary of the invention, as well as in the appended claims, are complied with. It would be understood that various changes may be made in the details of construction, as well as in the use and operation of the apparatus of the present invention, all within the spirit and scope of the invention as recited in the appended claims.

What is claimed is:

1. Apparatus for storing ice in a storage bin and for dispensing ice from a storage bin, comprising:

(a) a storage bin for receiving pieces of ice therein;

(b) ice agitation means for engaging ice pieces and agitating them, to loosen ice pieces from adherence to each other;

(c) ice dispenser means for engaging pieces of ice and delivering them to a dispenser outlet for dispensing ice from the storage bin;

(d) first drive means for driving the ice agitation means;

(e) second drive means for driving the ice dispenser means; and (f) wherein said first and second drive means are separate from each other, wherein the ice agitation means comprises first, upper, agitation means and second, lower, agitation means, each carried in the storage bin; with the first, upper agitation means comprising means facilitating delivery of ice pieces to the second, lower, agitation means; and with second, lower agitation means comprising means facilitating delivery of ice to the ice dispenser means.

2. The apparatus of claim 1, wherein said first drive means is provided with periodic first activation means for periodically activating the first drive means for periodically agitating the ice.

3. The apparatus of claim 2, wherein said periodic first activation means comprises timer means.

4. The apparatus of claim 1, wherein the second drive means comprises second activation means for activating the second drive means when the ice dispensing means is desired to be operated.

5. The apparatus of claim 1, wherein the bin includes internal side, front and back wall means, at least some of which are shaped to facilitate movement of ice pieces from the front wall toward a central location of the back wall, wherein said ice dispenser means comprises means for lifting ice pieces from a lower location in the storage bin to an upper location where the dispenser outlet is located, wherein the dispenser means comprises a dispenser tube and a dispenser auger, carried in said tube, for lifting ice pieces through said tube, and with the dispenser tube having an inlet opening located near the back wall means of the bin, generally midway between the side wall means of the bin, for receiving ice pieces therein.

6. The apparatus of claim 1, wherein the ice agitation means comprises at least one rotating bar having right and left auger means carried thereby, each comprising means for urging ice pieces toward the opposite auger.

7. The apparatus of claim 6, wherein said right and left auger means are carried by the same rotating bar and comprises means whereby thrust loads resulting from urging ice pieces toward an opposite auger are caused to oppose each other within the same rotating bar.

8. The apparatus of claim 1, wherein said ice dispenser means comprises means for lifting ice pieces from a lower location in the storage bin to an upper location where the dispenser outlet is located.

9. The apparatus of claim 8, wherein the dispenser means comprises a dispenser tube and a dispense auger, carried in said tube, for lifting ice pieces through said tube.

10. The apparatus of claim 9, wherein the dispenser auger is mounted at an acute angle to the vertical, or approximately 45°.

11. Apparatus for storing ice in a storage bin and for dispensing ice from a storage bin, comprising:

(a) a storage bin for receiving pieces of ice therein and having lower and upper ends;

(b) ice agitation means for engaging ice pieces and agitating them, to loosen ice pieces from adherence to each other;

(c) ice dispenser means locate in said storage bin, between lower and upper ends thereof, for engaging pieces of ice and delivering them from a lower end of the storage bin to a dispenser outlet from said storage bin, for dispensing ice from an upper end of the storage bin;

(d) first drive means for driving the ice agitation means;

(e) second drive means for driving the ice dispenser means; and (f) wherein said first and second drive means are separate from each other, wherein the ice agitation means comprises at least one rotating bar having right and left auger means carried thereby, each comprising means for urging ice pieces toward the opposite auger, wherein the ice agitation means comprises first, upper, agitation means and second, lower, agitation means, wherein both upper and lower agitation means each comprises a rotating bar having right and left auger means carried thereby, each comprising means for urging ice pieces toward the opposite auger.

12. The apparatus of claim 11, wherein said right and left auger means are carried by the same rotating bar and comprise means whereby thrust loads resulting from urging ice pieces toward an opposite auger are caused to oppose each other within the same rotating bar.

13. Apparatus for storing ice in a storage bin and for dispensing ice from a storage bin, comprising:

(a) a storage bin for receiving pieces of ice therein;

(b) ice agitation means for engaging ice pieces and agitating them, to loosen ice pieces from adherence to each other;

(c) ice dispenser means for engaging pieces of ice and delivering them to a dispenser outlet for dispensing ice from the storage bin;

(d) first drive means for driving the ice agitation means;

(e) second drive means for driving the ice dispenser means; and (f) wherein said first and second drive means are separate from each other, wherein the ice agitation means and the ice dispenser means each include rotationally driven augers mounted for rotation at approximately right angles to each other.

14. Apparatus for storing ice in a storage bin and for dispensing ice from storage bin, comprising:

(a) a storage bin for receiving pieces of ice therein and having lower and upper ends;

(b) ice agitation means for engaging ice pieces and a agitating them, to loosen ice pieces from adherence to each other;

(c) ice dispenser means located in said storage bin, between lower and upper ends thereof, for engaging pieces of ice and delivering them from a lower end of the storage bin to a dispenser outlet from said storage bin, for dispensing ice from an upper end of the storage bin;

(d) first drive means for driving the ice agitation means;

(e) second drive means for driving the ice dispenser means; and (f) wherein said first and second drive means are separate from each other, wherein the dispenser outlet comprises at least one dispenser chute, angularly adjustable for adjustably positioning the chute for filling variously configured containers for receiving ice pieces therefrom.

15. Apparatus for storing ice in a storage bin and for dispensing ice from a storage bin, comprising:

(a) a storage bin for receiving pieces of ice therein and having lower and upper ends;

(b) ice agitation means for engaging ice pieces and agitating them, to loosen ice pieces from adherence to each other;

(c) ice dispenser means located in said storage bin, between lower and upper ends thereof, for engaging pieces of ice and delivering them from a lower end of the storage bin to a dispenser outlet from said storage bin, for dispensing ice from an upper end of the storage bin;

(d) first drive means for driving the ice agitation means;

(e) second drive means for driving the ice dispenser means; and (f) wherein said first and second drive means are separate from each other, including a container support carried on the bin, for supporting a container for receiving ice pieces dispensed from the dispenser outlet, wherein said support is pivotally adjustable from a location beneath said dispenser outlet to a location removed from beneath said dispenser outlet, for facilitating placement of a cart beneath said outlet and the receipt of ice into a cart placed therebeneath.

16. Apparatus for storing ice in a storage bin and for dispensing ice from a storage bin comprising:

(a) a storage bin for receiving pieces of ice therein;

(b) ice agitation means for engaging ice pieces and agitating them, to loosen ice pieces from adherence to each other;

(c) ice dispenser means for engaging pieces of ice and delivering them to a dispenser outlet for dispensing ice from the storage bin;

(d) drive means for driving the ice agitation means and the ice dispenser means;

(e) with said drive means including shafts and bearing mounts for those shafts; with the storage bin having clearance holes for passing of shafts therethrough, with the shafts being free of support from the storage bin; and with a storage bin frame structure for carrying and supporting the bearing mounts for the shafts, separate from the storage bin.

17. Apparatus for storing ice in a storage bin and for dispensing ice from a storage bin, comprising:

(a) a storage bin for receiving pieces of ice therein;

(b) ice agitation means for engaging ice pieces and agitating them, to loosen ice pieces from adherence to each other;

(c) ice dispenser means for engaging pieces of ice and delivering them to a dispenser outlet for dispensing ice from the storage bin;

(d) first drive means for driving the ice agitation means;

(e) second drive means for driving the ice dispenser means; and (f) wherein said first and second drive means are separate from each other, wherein said first drive means is provided with a periodic first activation means for periodically activating the first drive means for periodically agitating the ice wherein the second drive means comprises second activation means for activating the second drive means when the ice dispensing means is desired to be operated, wherein the ice agitation means comprises first, upper agitation means and second, lower, agitation means, each carried in the storage bin; with the first, upper agitation means comprising means facilitating delivery of ice pieces to the second, lower, agitation means; and with second, lower agitation means comprising means facilitating delivery of ice to the ice dispenser means, wherein the ice agitation means comprises at least one rotating bar having right and left auger means carried thereby each comprising means for urging ice pieces toward the opposite auger, wherein said right and left auger means are carried by the same rotating bar and comprises mean whereby thrust loads resulting from urging ice pieces toward an opposite auger are caused to oppose each other within the same rotating bar, wherein both upper and lower agitation means each comprises a rotating bar having right an left auger means carried thereby, each comprising means for urging ice pieces toward the opposite auger, wherein the ice agitation means and the ice dispenser means each include rotationally driven augers mounted for rotation at approximately right angles to each other, wherein the dispenser outlet comprises at least one dispenser chute, angularly adjustable for adjustably positioning the chute or filing variously configured containers for receiving ice pieces therefrom, wherein the bin includes internal side, front and back wall means, at least some of which are shaped to facilitate movement of ice pieces from the front wall toward a central location of the back wall, wherein said ice dispenser means comprises means for lifting ice pieces from a lower location in the storage bin to an upper location where the dispenser outlet is located, wherein the dispenser means comprises dispenser tube and a dispenser auger, carried in said tube, for lifting ice pieces through said tube, and with the dispenser tube having an inlet opening located near the back wall means of the bin, generally midway between the side all means of the bin, for receiving ice pieces therein, including a container support carried on the bin, for supporting a container for receiving ice pieces dispensed from the dispenser outlet, and wherein said support is pivotally adjustable from a location beneath said dispenser outlet to a location removed from beneath said dispenser outlet, for facilitating placement of a cart beneath said outlet the receipt of ice into a cart placed therebeneath.

* * * * *